US012679913B2

(12) United States Patent (10) Patent No.: US 12,679,913 B2
Ishikawa et al. (45) Date of Patent: Jul. 14, 2026

(54) POLY(VINYL ALCOHOL) RESIN

(71) Applicant: SEKISUI CHEMICAL CO., LTD., Osaka (JP)

(72) Inventors: Yuki Ishikawa, Osaka (JP); Masumi Fujita, Osaka (JP); Shizuka Sugihara, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 515 days.

(21) Appl. No.: 18/280,026

(22) PCT Filed: Mar. 7, 2022

(86) PCT No.: PCT/JP2022/009674
§ 371 (c)(1),
(2) Date: Sep. 1, 2023

(87) PCT Pub. No.: WO2022/191122
PCT Pub. Date: Sep. 15, 2022

(65) Prior Publication Data
US 2024/0141082 A1 May 2, 2024

(30) Foreign Application Priority Data
Mar. 8, 2021 (JP) ................................. 2021-036478

(51) Int. Cl.
*C08F 216/06* (2006.01)
*C08F 218/08* (2006.01)
*C08L 29/04* (2006.01)
*C08F 8/12* (2006.01)
*C08F 8/14* (2006.01)
*C08F 8/16* (2006.01)

(52) U.S. Cl.
CPC ............ *C08F 216/06* (2013.01); *C08L 29/04* (2013.01); *C08F 8/12* (2013.01); *C08F 8/14* (2013.01); *C08F 8/16* (2013.01); *C08F 218/08* (2013.01)

(58) Field of Classification Search
CPC .... C08F 216/06; C08F 218/08; C08F 216/38; C08F 8/12; C08F 8/14; C08F 8/16; C08L 29/04
See application file for complete search history.

(56) References Cited

U.S. PATENT DOCUMENTS

| | | | | |
|---|---|---|---|---|
| 6,472,470 | B1 * | 10/2002 | Fujiwara | C08F 8/12 |
| | | | | 525/61 |
| 10,711,081 | B2 * | 7/2020 | Ute | C08F 216/38 |
| 11,377,506 | B2 * | 7/2022 | Ute | C08F 218/08 |
| 12,065,517 | B2 * | 8/2024 | Okamoto | C08F 16/06 |
| 12,084,526 | B2 * | 9/2024 | Nishimura | C08F 2/20 |
| 2019/0153136 | A1 | 5/2019 | Ute et al. | |
| 2020/0347165 | A1 | 11/2020 | Ute et al. | |
| 2021/0309770 | A1 | 10/2021 | Okamoto et al. | |

FOREIGN PATENT DOCUMENTS

| | | | |
|---|---|---|---|
| CN | 102863567 | | 1/2013 |
| CN | 105218713 | | 1/2016 |
| JP | 2-187482 | | 7/1990 |
| JP | 6-234899 | | 8/1994 |
| JP | 11-504374 | | 4/1999 |
| JP | 2000220028 A | * | 8/2000 |
| JP | 2000234214 A | * | 8/2000 |
| JP | 2000-351853 | | 12/2000 |
| JP | 2001020135 A | * | 1/2001 |
| JP | 2003-20309 | | 1/2003 |
| JP | 2006-181815 | | 7/2006 |
| WO | 96/34897 | | 11/1996 |
| WO | 2017/195735 | | 11/2017 |
| WO | 2019/098247 | | 5/2019 |
| WO | 2020/050255 | | 3/2020 |

OTHER PUBLICATIONS

English language translation of International Search Report issued May 10, 2022 in corresponding International (PCT) Patent Application No. PCT/JP2022/009674.
Misaki Senoo et al., "Monomer sequence analysis of the poly(vinyl alcohol-co-vinyl acetate)s prepared by various polymer reactions", Polymer Preprints, Japan vol. 65, No. 1, 2016.

* cited by examiner

*Primary Examiner* — Rip A Lee
(74) *Attorney, Agent, or Firm* — Wenderoth, Lind & Ponack, L.L.P.

(57) ABSTRACT
The present invention provides a polyvinyl alcohol resin with which a polyvinyl acetal resin having a controlled particle size and forming less lumps during dissolution to exhibit excellent solubility can be produced. Provided is a polyvinyl alcohol resin containing: methyl acetate; a vinyl alcohol unit; and a vinyl acetate unit, the methyl acetate being contained in an amount of 0.05 to 3% by weight, the vinyl alcohol unit being contained in an amount of 80 to 99.5 mol %, the vinyl acetate unit having a mean chain length $L_A$ of 1 to 4.5, the vinyl alcohol unit having a mean chain length $L_O$ of 1 to 30.

4 Claims, No Drawings

POLY(VINYL ALCOHOL) RESIN

TECHNICAL FIELD

The present invention relates to a polyvinyl alcohol resin.

BACKGROUND ART

Polyvinyl alcohol is a resin used as a raw material of a polyvinyl acetal resin. Polyvinyl alcohol is acetalized into a polyvinyl acetal resin, exhibiting excellent properties including toughness, adhesion, crosslinkability, and hygroscopicity (Patent Literature 1 and Non-Patent Literature 1).

CITATION LIST

Patent Literature

Patent Literature 1: WO 2019/098247

Non-Patent Literature

Non-Patent Literature 1: Polymer Preprints, Japan Vol. 65, No. 1

SUMMARY OF INVENTION

Technical Problem

Polyvinyl alcohol is generally produced by saponifying polyvinyl acetate dissolved in methanol with sodium hydroxide or sodium methoxide. However, polyvinyl alcohol obtained by a conventional method is poorly soluble in solvents. Particularly when polyvinyl alcohol is used in an aqueous solvent, a desired effect cannot be achieved.

For example, when a polyvinyl acetal resin is produced using a vinyl alcohol-vinyl acetate copolymer produced by the method disclosed in Patent Literature 1 and Non-Patent Literature 1, the solubility of polyvinyl alcohol is improved but the shape of resin particles obtained in the production of the polyvinyl acetal resin may be distorted. In this case, lumps are formed upon dissolution of such a polyvinyl acetal resin in a solvent, and the dissolution time is disadvantageously prolonged.

The present invention aims to provide a polyvinyl alcohol resin with which a polyvinyl acetal resin having a controlled particle size and forming less lumps during dissolution to exhibit excellent solubility can be produced.

Solution to Problem

The present invention relates to a polyvinyl alcohol resin containing: methyl acetate; a vinyl alcohol unit; and a vinyl acetate unit, the methyl acetate being contained in an amount of 0.05 to 3% by weight, the vinyl alcohol unit being contained in an amount of 80 to 99.5 mol %, the vinyl acetate unit having a mean chain length $L_A$ of 1 to 4.5, the vinyl alcohol unit having a mean chain length $L_O$ of 1 to 30.

The present invention will be described in detail below.

The polyvinyl alcohol resin of the present invention contains a vinyl acetate unit (unit of vinyl acetate) and a vinyl alcohol unit (unit of vinyl alcohol).

The terms "vinyl alcohol unit" and "vinyl acetate unit" herein respectively refer to "vinyl alcohol" and "vinyl acetate" present in the polyvinyl alcohol resin.

The lower limit of the amount of methyl acetate in the polyvinyl alcohol resin of the present invention is 0.05% by weight and the upper limit thereof is 3% by weight. When the amount of methyl acetate is within such a range, a polyvinyl acetal resin prepared using the polyvinyl alcohol resin of the present invention has a uniform particle shape. The lower limit of the amount is more preferably 0.06% by weight, and the upper limit thereof is more preferably 2% by weight or less, still more preferably 1.5% by weight or less.

The amount of methyl acetate contained in the polyvinyl alcohol resin may be measured by any method. For example, the polyvinyl alcohol resin obtained is dissolved in dimethylsulfoxide to prepare a solution, and the measurement is performed on the solution using GC-2010 (available from Shimadzu Corporation), an INNOWAX polar column, and a flame ionization detector (FID).

The lower limit of the amount of the vinyl alcohol unit in the polyvinyl alcohol resin of the present invention is 80 mol % and the upper limit thereof is 99.5 mol %. When the amount of the vinyl alcohol unit is within such a range, a function of the hydroxy group of the vinyl alcohol can be imparted to polyvinyl alcohol resin molecules, which enables control of the solubility in water or solvents. When the amount of the vinyl alcohol unit is within the above range, the solubility of the polyvinyl alcohol resin can be improved in dissolving the polyvinyl alcohol resin in water to prepare an aqueous solution for acetalization. The lower limit of the amount of the vinyl alcohol unit in the polyvinyl alcohol resin is preferably 86.0 mol %, and the upper limit thereof is preferably 99.3 mol %. The amount of the vinyl acetate unit and the amount of the vinyl alcohol unit can be measured in conformity with Testing methods for polyvinyl alcohol of JIS K 6726.

The amount of the vinyl acetate unit in the polyvinyl alcohol resin of the present invention is preferably 0.5 to 20 mol %, more preferably 0.5 to 18 mol %, still more preferably 0.5 to 15 mol %.

The vinyl acetate unit in the polyvinyl alcohol resin of the present invention has a mean chain length $L_A$ of 1 to 4.5. When the mean chain length $L_A$ of the vinyl acetate unit is within the above range, the solubility of the polyvinyl alcohol resin in solvents can be improved. $L_A$ is preferably 4 or shorter, more preferably 3.6 or shorter, still more preferably 3.0 or shorter.

The "mean chain length $L_A$ of the vinyl acetate unit" herein can be calculated using the following formula (1).

[Math. 1]

$$L_A = \frac{I_{AAA} + I_{AAO} + I_{OAO}}{I_{OAO} + I_{AAO}/2} \tag{1}$$

In the formula (1), I represents the intensity obtained by ¹H-NMR. "AAA, AAO, OAO, AOA, AOO, OOO" are as described below.

First, the polyvinyl alcohol resin of the present invention is divided into triads having a vinyl alcohol unit (hereinafter simply referred to as O) and/or a vinyl acetate unit (hereinafter also simply referred to as A). Then, "vinyl alcohol-centered triads" are classified into "AOA, AOO, OOO", and "vinyl acetate-centered triads" are classified into "AAA, AAO, OAO". Note that "AOO" and "OOA" are both represented as "AOO", and "AAO" and "OAA" are both represented as "AAO". That is, "$I_{OOO}$" represents "intensity of OOO measured by ¹H-NMR".

The vinyl alcohol unit of the polyvinyl alcohol resin of the present invention has a mean chain length $L_O$ of 1 to 30. When the mean chain length $L_O$ is within the above range, the water solubility of the polyvinyl alcohol resin is controlled, and the particle size in the production of polyvinyl acetal can be controlled. The resulting polyvinyl acetal has excellent solubility, preventing the formation of lumps during dissolution.

The "mean chain length $L_O$ of the vinyl alcohol unit" herein can be calculated using the following formula (2). $L_O$ is preferably 1 or longer, more preferably 3 or longer, still more preferably 7 or longer.

In the formula (2), I represents the intensity obtained by $^1$H-NMR. That is, "$I_{OOO}$" represents "intensity of OOO measured by $^1$H-NMR".

[Math. 2]

$$L_O = \frac{I_{OOO} + I_{AOO} + I_{AOA}}{I_{AOA} + I_{AOO}/2} \qquad (2)$$

In the polyvinyl alcohol resin of the present invention, the mean chain length $L_O$ of the vinyl alcohol unit is preferably longer than the mean chain length $L_A$ of the vinyl acetate unit. The sum of the mean chain length $L_A$ of the vinyl acetate unit and the mean chain length $L_O$ of the vinyl alcohol unit ($L_A+L_O$) is preferably 2 to 30.

The polyvinyl alcohol resin of the present invention preferably has a randomness value ρ (mean persistence ratio, represented by R in the following formula (3)) of 0.35 to 1. The randomness value ρ is obtained using the following formula (3) based on the mean chain length $L_O$ of the vinyl alcohol unit and the mean chain length $L_A$ of the vinyl acetate unit. When the randomness value ρ (mean persistence ratio) is within the above range, formation of lumps of the polyvinyl acetal resin obtained by acetalization of the polyvinyl alcohol resin can be suppressed. Thus, a polyvinyl acetal resin having excellent solubility can be achieved.

The randomness value ρ is an index to determine whether the whole polymer chain has a block structure or a random structure. When the randomness value ρ is 0, the whole polymer chain has a block structure. When the randomness value ρ is 1, the whole polymer chain has a random structure.

When the randomness value ρ is 2, the vinyl alcohol unit and the vinyl acetate unit coexist alternately in a molecule.

The upper limit of the randomness value ρ is preferably 0.95, more preferably 0.9 or less. The lower limit thereof is preferably 0.4, more preferably 0.45, still more preferably 0.5 or more. When the randomness value ρ is within this range, formation of lumps of the polyvinyl acetal resin obtained by acetalization of the polyvinyl alcohol resin is suppressed. Thus, the solubility is improved.

[Math. 3]

$$R = \frac{1}{L_A} + \frac{1}{L_O} \qquad (3)$$

The polyvinyl alcohol resin of the present invention preferably has a degree of polymerization (viscosity average degree of polymerization) of 1,000 to 4,000. When the degree of polymerization is within the above range, the polyvinyl alcohol resin can exhibit good physical properties when formed into a film.

The degree of polymerization can be measured in conformity with Testing methods for polyvinyl alcohol of JIS K 6726.

The polyvinyl alcohol resin of the present invention preferably has a melting point of 30° C. to 240° C. The melting point can be measured with a differential scanning calorimeter.

The polyvinyl alcohol resin of the present invention may further contain a unit of a different monomer.

Any different monomer may be used. Preferred is a monomer having one olefinic double bond and at least one functional group selected from the group consisting of a carboxy group, a hydroxy group, an amide group, an amino group, an epoxy group, and an ether group. Examples of such a monomer include crotonic acid, maleic acid, fumaric acid, citraconic acid, mesaconic acid, itaconic acid, allyl alcohol, vinyl ether, and allylamine.

These functional groups may be introduced by copolymerization upon polymerization of vinyl acetate or may be introduced into polyvinyl alcohol obtained by saponification.

The amount of the unit of a different monomer in the polyvinyl alcohol resin of the present invention is not limited because it is designed according to the application. The amount in the whole polyvinyl alcohol resin is preferably 20 mol % or less, more preferably 10 mol % or less, still more preferably 5 mol % or less. The amount is normally 0 mol % or more, and may be 1 mol % or more, for example.

The polyvinyl alcohol resin may have any shape. Preferred is a particle shape or a powder shape.

The polyvinyl alcohol resin of the present invention may be produced by any method. For example, the polyvinyl alcohol resin of the present invention is obtainable by saponifying, i.e., hydrolyzing polyvinyl acetate that is prepared by polymerizing vinyl acetate by solution polymerization, bulk polymerization, suspension polymerization, emulsion polymerization, or the like.

The temperature upon polymerization for preparing the polyvinyl acetate is preferably, but not limited to, 0° C. to 180° C., more preferably 20° C. to 120° C., still more preferably 40° C. to 90° C.

The degree of polymerization of the polyvinyl acetate can be measured after saponification in conformity with Testing methods for polyvinyl alcohol of JIS K 6726.

A catalyst used for the saponification is normally a base or an acid. A base is particularly preferably used.

The base (saponification catalyst) is preferably a compound containing an alkali metal, in particular, a compound containing a sodium atom or a potassium atom. Examples of the compound containing a sodium atom include sodium hydroxide and sodium methoxide.

Examples of the compound containing a potassium atom include potassium tert-butoxide (BuOK).

The base used is also preferably tetrabutylammonium hydroxide (TBAH).

Among these, more preferred are BuOK and TBAH.

The amount of the base to be added is preferably 0.001 to 0.5 mol, more preferably 0.002 to 0.4 mol, still more preferably 0.003 to 0.2 mol, in terms of the molar ratio to the vinyl acetate unit in the vinyl acetate polymer.

The solvent used in the saponification is preferably methanol or a solvent mixture containing methanol and water.

Upon saponification of polyvinyl acetate, the polyvinyl acetate solution concentration (after addition of a base) is preferably 3 to 40% by weight, more preferably 5 to 35% by weight, still more preferably 8 to 30% by weight, even more preferably 10 to 25% by weight. When the polyvinyl acetate solution concentration at the time of saponification is within this range, control of the mean chain length $L_A$ of the vinyl acetate unit and the mean chain length $L_O$ of the vinyl alcohol unit is facilitated, suppressing the formation of lumps of a polyvinyl acetal resin obtained by acetalization.

When the base used is sodium methoxide or potassium tert-butoxide, the solvent used for the saponification is preferably methanol.

When the base used is sodium hydroxide, the solvent used for the saponification is preferably a solvent mixture of methanol and water. The content ratio by weight of methanol and water in the solvent mixture is preferably methanol/water=99/1 to 70/30. The upper limit of the weight percentage of methanol is preferably 95% by weight or less, more preferably 90% by weight or less.

The solvent may contain an alcohol such as ethanol, an ester such as methyl acetate or ethyl acetate, a ketone such as acetone or methyl ethyl ketone, an aromatic hydrocarbon such as benzene or toluene, or the like.

The reaction temperature in the saponification (temperature at which the base is added to the polyvinyl acetate solution for reaction) is not limited and can be selected from the range of 0° C. to 100° C. The reaction temperature is preferably 5° C. to 50° C., more preferably 10° C. to 48° C., still more preferably 15° C. to 45° C. When the reaction temperature is within this range, control of the mean chain length $L_A$ of the vinyl acetate unit and the mean chain length $L_O$ of the vinyl alcohol unit is facilitated, suppressing the formation of lumps of a polyvinyl acetal resin obtained by acetalization.

The saponification time (time from the addition of the base to the polyvinyl acetate solution to the end of the reaction) is preferably 15 to 170 minutes, more preferably 20 to 150 minutes, still more preferably 25 to 130 minutes. When the saponification time is equal to or longer than the lower limit, widening of the composition distribution of the polyvinyl alcohol can be suppressed. When the saponification time is equal to or shorter than the upper limit, generation of a highly saponified portion can be suppressed, preventing the generation of insoluble resin when the polyvinyl acetal resin is dissolved in a solvent.

The production method preferably further includes a washing step after the saponification.

The washing step involves washing polyvinyl alcohol with a washing liquid mixture. The washing liquid mixture contains, for example, methanol, water, acetic acid, and the like. The ratio between methanol and other solvents is preferably changed according to the degree of saponification and the values of $L_A$ and $L_O$. The washing step is preferably performed twice or more. In such a case, the ratio of the components in the washing liquid used in the first washing and the ratio of the components in the washing liquid used in the second or later washing may be changed. The solid content concentration of polyvinyl alcohol in the washing step is not limited, and is preferably 1 to 25% by weight. The amount of the solvent in the washing step is preferably 1 time or more, more preferably 2 times or more the amount of the object to be washed.

The production method may include a drying step after the washing step, if necessary. The temperature and time in the drying step are not limited. The drying is preferably performed at 30° C. to 150° C. for 1 to 24 hours, more preferably at 40° C. to 120° C. for 1.5 to 10 hours. The number of times of drying in the drying step is preferably 2 or more, more preferably 3 or more. Drying under such conditions facilitates control of the methyl acetate content.

Various physical properties of the polyvinyl alcohol resin of the present invention are controllable by the degree of polymerization and concentration of polyvinyl acetate as a raw material, the temperature and time of the saponification reaction, the type and concentration of the base used in the saponification, the type and amount of the solvent added, the degree of washing in the washing step, operation in the drying step, and the like. In particular, various properties can be controlled by changing the time and temperature for immersion of pulverized gel in the washing liquid after the saponification, increasing the number of times of washing, increasing the amount of the solvent used for washing, and changing the drying temperature and drying time after the washing. By the method as described above, for example, the amount of methyl acetate produced as a by-product in the saponification of polyvinyl acetate can be controlled.

Moreover, various physical properties of the polyvinyl alcohol resin of the present invention can be controlled by performing a washing step and a drying step after the saponification and further adding methyl acetate. The timing of adding the methyl acetate is preferably after performing the washing step and the drying step.

In this case, the amount of the methyl acetate to be added is preferably 0.05 to 3% by weight relative to the polyvinyl alcohol resin.

The polyvinyl alcohol resin of the present invention can be used, for example, as a raw material of a viscosity modifier for an aqueous solution, a gas barrier coating agent, a suspension agent, an emulsifier, a polarizing plate, a water-soluble film, a dispersant, various resins, or the like. It can also be used as a polyvinyl alcohol resin composition containing the polyvinyl alcohol resin of the present invention.

When a polyvinyl acetal resin is produced using the polyvinyl alcohol resin of the present invention, the resulting resin particles have a uniform particle size, which enables prevention of the formation of lumps during dissolution of the resin in a solvent and shortening of the dissolution time.

Advantageous Effects of Invention

The present invention can provide a polyvinyl alcohol resin with which a polyvinyl acetal resin having a controlled particle size and forming less lumps during dissolution to exhibit excellent solubility can be produced.

DESCRIPTION OF EMBODIMENTS

The embodiments of the present invention will be described in more detail with reference to examples below, but the present invention is not limited only to these examples.

Example 1

Methanol was added to a polyvinyl acetate copolymer having a viscosity average degree of polymerization of 1,000 as a raw material, followed by dissolution with stirring. Thus, a polyvinyl acetate solution (raw material solution for saponification, polyvinyl acetate concentration: 20% by weight) was prepared. A solution (3% concentration) of potassium tert-butoxide (BuOK) in methanol was added as a saponification catalyst (base) solution so that the molar ratio of the base to the vinyl acetate unit in the polyvinyl acetate copolymer was 0.0035 (polyvinyl acetate solution concentration after addition of the base was 19.4% by weight), followed by stirring. Thus, a mixture was obtained. The resulting mixture was held at 40° C. for 120 minutes to allow the saponification reaction to proceed.

The gel obtained by the saponification reaction was pulverized, immersed in a washing liquid containing methanol and acetic acid at 40° C. for one hour, and then deliquored using a centrifugal deliquoring machine. The resulting pulverized gel was again impregnated with a washing liquid containing methanol, and most of the liquid was removed using a centrifuge. Then, the pulverized gel was dried at 100° C. for one hour, then at 80° C. for one hour, and finally at 40° C. for 15 hours. The amount of the washing liquid was twice the amount of the pulverized gel after deliquoring.

The resulting product was put in a glass bottle, and methyl acetate in an amount of 0.06% by weight relative to the product was added. The contents in the glass bottle were mixed with a mix rotor for one hour. Thus, a target product (polyvinyl alcohol resin) was obtained. The resulting polyvinyl alcohol resin had a viscosity average degree of polymerization of 1,000, a vinyl acetate unit content of 13.2 mol %, a mean chain length $L_A$ of the vinyl acetate unit of 2.01, a vinyl alcohol unit content of 86.8 mol %, a mean chain length $L_O$ of the vinyl alcohol unit of 8.8, and a methyl acetate content of 0.06% by weight.

Examples 2 to 8, Comparative Example 2

A polyvinyl alcohol resin was produced as in Example 1, except that the degree of polymerization of polyvinyl acetate as a raw material, the concentration of the polyvinyl acetate solution, the type of the solvent, the type and amount of the saponification catalyst added, the saponification temperature, the saponification time, and the amount of methyl acetate added were changed as shown in Table 1.

"TBAH" in Table 1 represents "tetrabutylammonium hydroxide".

Comparative Example 1

A polyvinyl alcohol resin was produced as in Example 1, except that only washing was performed after stopping the reaction and methyl acetate was not added.

Comparative Examples 3 and 4

The degree of polymerization of polyvinyl acetate as a raw material, the concentration of the polyvinyl acetate solution, the type and amount of the saponification catalyst added were changed as shown in Table 1. Then, a polyvinyl alcohol resin was produced as in Example 1, except that, after stopping the reaction, the reaction product was immersed in a washing liquid containing methanol at 25° C. for one hour, deliquored using a centrifugal deliquoring machine, mostly deliquored using a centrifuge, and then dried at 105° C. for three hours, and methyl acetate was not added after drying.

Evaluation Methods

The polyvinyl alcohol resins obtained above were evaluated by the following methods. Table 1 shows the results.
(1-1) Mean Chain Lengths ($L_A$ and $L_O$) of Vinyl Acetate Unit and Vinyl Alcohol Unit
Each obtained polyvinyl alcohol resin was analyzed by $^1$H-NMR for determination of the composition ratio (vinyl acetate unit content, vinyl alcohol unit content) of the polyvinyl alcohol resin. The $^1$H-NMR measurement was performed using JEOL JNM-ECX500 and a DMSO-d$_6$ solution (1 wt/vol %) at 150° C. To eliminate the water peak, the presaturation method was used for the analysis. The use of the presaturation method eliminates the peak derived from a hydroxy group and thus improves the accuracy of the analysis. The triads were analyzed by NMR using NMR analysis software DELTA Ver. 5 available from Jeol Resonance Inc.

The triad proportion of each of the three vinyl alcohol-centered triads (AOA, AOO, and OOO) and the three vinyl acetate-centered triads (AAA, AAO, and OAO) was calculated from an area obtained by peak fitting. The peak assignments were made with reference to a document (Macromolecules 1982, 15, 1071). Peaks may have a split apex due to the steric structure or the like. For fitting, such a peak was regarded as one peak.

"AOO" and "OOA" were both represented as "AOO", and "AAO" and "OAA" were both represented as "AAO".

Further, the mean chain lengths ($L_A$ and $L_O$) of the vinyl acetate unit and the vinyl alcohol unit were calculated.

The randomness value ρ was calculated from $L_A$ and $L_O$.
(1-2) Methyl Acetate Content Measurement
To about 10 mg of the polyvinyl alcohol resin obtained was added 2 ml of dimethyl sulfoxide, followed by dissolution by heating on a hot plate at 70° C. After filtering with a 0.2-μm filter, the prepared solution in an amount of 1.0 μL was injected for the measurement using GC-2010 (available from Shimadzu Corporation), an INNOWAX polar column, and an FID at a helium flow rate of 1 ml/min by increasing the column temperature from 50° C. to 250° C.
(2) Shape of Polyvinyl Butyral Resin Particles
(2-1) Production of Polyvinyl Acetal Resin Particles (Polyvinyl Butyral Resin Particles)
To 250 g of the polyvinyl alcohol resin obtained was added 2,700 g of pure water, followed by dissolution of the polyvinyl alcohol resin with stirring at a temperature of 90° C. for about two hours. The resulting solution was cooled to 40° C., and 100 g of hydrochloric acid having a concentration of 35% by weight and 115 g of butyraldehyde were added thereto in stages. The mixture was held at a liquid temperature of 40° C. for three hours to carry out an acetalization reaction, followed by neutralization and washing with water by normal methods. Thus, polyvinyl butyral resin particles were obtained.
(2-2) Shape Evaluation
The shape of the polyvinyl butyral resin particles obtained was visually observed and evaluated according to the following criteria.
  ○ (Good): Uniform shape
  Δ (Fair): Containing distorted resin particles
  × (Poor): Irregular particle shape or not evaluable
(2-3) Solubility Evaluation
The polyvinyl butyral resin obtained in an amount of 10 g was added to 100 g of a solvent mixture of ethanol and toluene (mixing ratio by weight 1:1). The mixture was shaken at room temperature for two hours, allowed to stand still, and visually observed. The symbol "○" indicates that resin particles not dissolved in the solvent were not observed; "Δ" indicates that resin particles not dissolved in the solvent were slightly present; and "×" indicates that many resin particles not dissolved in the solvent were present.
(2-4) Evaluation of Amount of Insoluble Resin
A polyvinyl butyral resin prepared using the polyvinyl alcohol resin obtained in each of Example 8 and Comparative Example 4 was dissolved in a solution mixture of ethanol and toluene (weight ratio 1:1) to a concentration of 0.2% by weight. The particle size distribution of 10 ml of the resulting solution was measured using a particle counter (KS-42C available from Rion Co., Ltd.), and the number of particles with a diameter of 0.5 to 1.0 μm per 1 ml was determined. The number was 10,000 or less in Example 8, whereas the number was 10,000 or more in Comparative Example 4.

This result shows that a solution with an extremely small amount of minute insoluble resin particles can be produced from a polyvinyl butyral resin prepared using the polyvinyl alcohol resin of Example 8.

5

TABLE 1

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Production process | Degree of polymerization of polyvinyl acetate | 1000 | 3000 | 1700 | 300 | 1700 | 800 | 1700 | 1000 | 1000 | 1000 | 500 | 500 |
| | Saponification conditions — Raw material solution for saponification — Concentration of polyvinyl acetate solution (wt %) | 20 | 15 | 15 | 25 | 30 | 30 | 15 | 15 | 20 | 20 | 35 | 35 |
| | Type of solvent | MeOH | MeOH/water 80/20 | MeOH | MeOH/water 80/20 | MeOH | MeOH | MeOH | MeOH | MeOH | MeOH | MeOH | MeOH |
| | Type of base | BuOK | TBAH | BuOK | NaOH | BuOK | BuOK | BuOK | BuOK | BuOK | BuOK | NaOH | NaOH |
| | Amount of base added (mol) | 0.0035 | 0.01 | 0.1 | 0.12 | 0.0025 | 0.002 | 0.0035 | 0.06 | 0.0035 | 0.0035 | 0.001 | 0.01 |
| | Concentration of polyvinyl acetate solution after addition of base (wt %) | 19.4 | 13.0 | 9.1 | 17.1 | 29.4 | 29.5 | 14.8 | 12.1 | 19.4 | 19.4 | 34.8 | 19.3 |
| | Saponification temperature (° C.) | 40 | 34 | 38 | 45 | 40 | 40 | 40 | 40 | 40 | 40 | 40 | 40 |
| | Saponification time (min) | 120 | 150 | 120 | 120 | 120 | 120 | 120 | 30 | 120 | 120 | 180 | 120 |
| | Post process — Amount of methyl acetate added (wt %) | 0.06 | 0.51 | 0.68 | 1.1 | 2.3 | 0.03 | 2.0 | 2.4 | None | 5.02 | None | None |
| Polyvinyl alcohol resin | Vinyl acetate unit Amount (mol %) | 13.2 | 1.9 | 0.9 | 17.7 | 7.7 | 11.2 | 19.8 | 1.4 | 13.2 | 13.2 | 15.2 | 0.4 |
| | $L_A$ | 2.01 | 1.23 | 1.36 | 2.8 | 1.95 | 2.23 | 2.83 | 1.27 | 2.01 | 2.01 | 4.61 | 1.13 |
| | Vinyl alcohol unit Amount (mol %) | 86.8 | 98.1 | 99.1 | 82.3 | 92.3 | 88.8 | 80.2 | 98.6 | 86.8 | 86.8 | 84.8 | 99.6 |
| | $L_O$ | 8.8 | 15.57 | 22.52 | 10.69 | 10.98 | 11.39 | 8.5 | 19.3 | 8.8 | 8.8 | 10.5 | 34.3 |
| | $\rho$ | 0.61 | 0.88 | 0.78 | 0.45 | 0.60 | 0.54 | 0.47 | 0.97 | 0.61 | 0.61 | 0.31 | 0.91 |
| | Degree of polymerization | 1000 | 3000 | 1700 | 300 | 1700 | 2000 | 1700 | 800 | 1000 | 1000 | 500 | 500 |

TABLE 1-continued

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Amount of methyl acetate in polyvinyl alcohol resin | Amount (wt %) | 0.06 | 0.48 | 0.64 | 0.9 | 2.0 | 0.05 | 1.6 | 2.2 | Less than detection limit* | 5.00 | 1.9 | 1.3 |
| Evaluation | Particle shape | ○ | ○ | ○ | △ | ○ | ○ | △ | △ | × | × | × | × |
| | Solubility | ○ | ○ | ○ | △ | ○ | ○ | △ | △ | × | × | × | × |

* Less than detection limit: less than 0.05 wt %

INDUSTRIAL APPLICABILITY

The present invention can provide a polyvinyl alcohol resin with which a polyvinyl acetal resin having a controlled particle size and forming less lumps during dissolution to exhibit excellent solubility can be produced.

The invention claimed is:

1. A polyvinyl alcohol resin comprising:

methyl acetate;

a vinyl alcohol unit; and a vinyl acetate unit, the methyl acetate is contained in an amount of 0.05 to 3% by weight, the vinyl alcohol unit is contained in an amount of 80 to 99.5 mol %, the vinyl acetate unit has a mean chain length $L_A$ of 1 to 4.5, the vinyl alcohol unit has a mean chain length $L_O$ of 1 to 30.

2. The polyvinyl alcohol resin according to claim 1, which has a degree of polymerization of 1,000 to 4,000.

3. The polyvinyl alcohol resin according to claim 1, wherein the vinyl alcohol unit is contained in an amount of 86.0 to 99.3 mol %.

4. The polyvinyl alcohol resin according to claim 1, which is for use in production of a polyvinyl acetal resin.

\* \* \* \* \*